US008623438B2

(12) United States Patent
Schlager Riebl et al.

(10) Patent No.: US 8,623,438 B2
(45) Date of Patent: Jan. 7, 2014

(54) DEHYDRATED AVOCADO IN PIECES

(75) Inventors: Erwin Hermann Schlager Riebl, Santiago (CL); Marco Antonio Fedelli Garrido, Santiago (CL)

(73) Assignee: Erwin Hermann Schlager Riebl, Santiago (CL)

( * ) Notice: Subject to any disclaimer, the term of this patent is extended or adjusted under 35 U.S.C. 154(b) by 592 days.

(21) Appl. No.: 12/743,447

(22) PCT Filed: Nov. 20, 2008

(86) PCT No.: PCT/IB2008/054874
§ 371 (c)(1),
(2), (4) Date: Sep. 21, 2010

(87) PCT Pub. No.: WO2009/066259
PCT Pub. Date: May 28, 2009

(65) Prior Publication Data
US 2011/0045150 A1    Feb. 24, 2011

(30) Foreign Application Priority Data
Nov. 20, 2007  (CL) .................................. 3320-2007

(51) Int. Cl.
*A23L 1/217*    (2006.01)
(52) U.S. Cl.
USPC ........... 426/242; 426/640; 426/392; 426/520; 426/518; 426/481; 426/482; 426/485; 426/443; 426/465; 426/321; 426/541; 99/517; 99/485
(58) Field of Classification Search
USPC ......... 426/242, 640, 392, 520, 518, 481, 482, 426/485, 443, 465, 321, 541; 99/517, 485
See application file for complete search history.

(56) References Cited

U.S. PATENT DOCUMENTS

| 3,339,603 | A | * | 9/1967 | Dall Argine et al. | ............ | 99/540 |
| 3,656,526 | A | * | 4/1972 | Belk et al. | ........................ | 99/564 |
| 4,341,803 | A | * | 7/1982 | Koshida et al. | ................ | 426/242 |
| 4,600,593 | A | * | 7/1986 | Swisher | ......................... | 426/438 |
| 4,629,629 | A | | 12/1986 | David | | |
| 5,035,909 | A | * | 7/1991 | Lomelin et al. | ................ | 426/473 |
| 5,097,755 | A | * | 3/1992 | Hill | ................................. | 99/484 |
| 5,384,147 | A | | 1/1995 | Hilpert | | |

| 5,871,794 | A | | 2/1999 | Brito | | |
| 6,358,555 | B1 | * | 3/2002 | Takahashi | ..................... | 426/615 |
| 2007/0116812 | A1 | | 5/2007 | Msika et al. | | |

FOREIGN PATENT DOCUMENTS

| AU | 199642145 A1 | 8/1996 |
| EP | 1474000 A1 | 11/2004 |
| MX | 230112 | 8/2005 |
| WO | 03/067996 A1 | 8/2003 |
| WO | 2006/088344 A2 | 8/2006 |
| WO | 2009/066259 A2 | 5/2009 |

OTHER PUBLICATIONS

Climacteric definition NPL, http://dictionary.reference.com/browse/climacteric, date:NA.*
International Preliminary Report on Patentability for International Application No. PCT/IB2008/054874; dated Nov. 20, 2008.
C. Pappas, et al; "The Effect of Process Conditions on the Drying Kinetics and Rehydration Characteristics of Some MW-Vacuum Dehydrated Fruits" Drying Technology, Taylor & Francis, Philadelphia, PA, US, vol. 17, No. 1-2, Jan. 1, 1999, pp. 157-174, XP008106342, ISSN: 0737-3937 abstract pp. 158-160, pp. 162-163, figure 2.
V. Orsat, et al; "Microwave-Assisted Drying of Biomaterials", Food and Bioproducts Processing, Institution of Chemical Engineers, Rugby, GB, vol. 85, No. 3, Sep. 1, 2007, pp. 255-263, XP022522631, ISSN: 0960-3085, Introduction, p. 255-266, materials, p. 258, p. 260, conclusions, p. 262.
A.E.Drouzas, et al; "Microwave Application in Vacuum Drying of Fruits", Journal of Food Engineering, vol. 28, No. 2, 1996, pp. 203-209, XP002537010, Introduction, Principles, Conclusion.
S.W. Souci, et al; "Food Compositions and Nutrition Tables" 2000, Medpharm, Stuttgart, XP002537011 p. 949.
International Search Report: PCT/IB2008/054874.

* cited by examiner

*Primary Examiner* — Drew Becker
*Assistant Examiner* — Preston Smith
(74) *Attorney, Agent, or Firm* — Ladas & Parry LLP

(57) ABSTRACT

A dehydrated avocado in pieces that is a semi-porous, rigid and fragile solid preserving the organoleptic properties of the fresh fruit and having a dry base weight chemical composition of 17.6 grams to 30.4 grams of carbohydrates, 6.8 grams to 8.4 grams of proteins, 61.2 grams to 69.2 grams of oil, 0.5 grams to 1.5 grams of water and 5.6 grams to 8.4 grams of fiber is produced selecting the avocado at a ripeness level higher than the climacteric maximum; pre-cooling; scalding; cutting the tip, wherein the tip is the section of the fruit immediately behind the petiole; removing the skin; slicing with the pit included; applying vacuum and microwave dehydration; and removing the pit sections from the slices.

9 Claims, No Drawings

DEHYDRATED AVOCADO IN PIECES

FIELD OF THE INVENTION

The present product and its process refer to the field of food manufacturing and conservation, especially to dehydrated avocado in pieces as ready-to-eat processed food, characterised by preserving the organoleptic properties which are typical of the fresh fruit.

BACKGROUND OF THE INVENTION

Currently a product like dehydrated avocado in pieces does not exist, nor does the processes that allows to obtain it without browning and oxidation of its compounds.

The following documents provide background of products somehow related thereto but that are in the end completely different to this invention:

Method of obtaining avocado powder under patent application number WO/2006/088344.

Drying of the avocado: stabilized flour of avocado pulp, processes and products, under patent number MX230112.

Other documents referring to avocado processing techniques are as follows:

Method of processing avocado pulp, under U.S. Pat. No. 5,384,147.

Stabilized guacamole and method for making same, under U.S. Pat. No. 5,871,794.

Process for producing frozen avocados, under U.S. Pat. No. 6,358,555.

Method for processing avocados, under U.S. Pat. No. 4,629,629.

Method for stabilizing fruit pulp or vegetable flesh, particularly avocado pulp, under patent number EP 1474000.

Next, the main preservation methods of avocado can be summarised as follows:

Cooling of an entire avocado, which means harvesting the fruit before it reaches the climacteric maximum (harvest ripeness), cold transporting to inhibit the ripening process and requiring high volume transport and warehousing.

Cooling of harvest ripe avocado using a ripening inhibitor product such as 1-Methylcyclopropene (1-MCP), which is commercialised in water-soluble powder form under the registered trademark SmartFresh.

Processing and freezing of avocado using preservatives, which alter some of the organoleptic properties such as taste, colour and texture, and on the other hand it affects the nutritional properties of the product as well.

A dehydrated avocado product in pieces is unique and novel since it preserves all the original properties of the avocado in terms of flavour, colour, smell and composition, with the great advantage of being in a ready to eat condition.

The process described below avoids avocado browning and also oxidation of its oil.

Another advantage of this process is that it is carried out in a rapid and simple manner, guaranteeing a quality end product with an extended shelf life.

OBJECT OF THE INVENTION

Obtaining dehydrated avocado pieces ready to be eaten without affecting both the nutritional and organoleptic properties of avocados, but only adding natural additives so as to obtain a healthy and natural end product. The product of this process allows for an extended preservation of the same at room temperature.

DETAILED DESCRIPTION OF THE INVENTION

The distinctive details of this novel product and process are clearly shown in the following description.

The dehydrated avocado in pieces is a semi-porous, rigid and fragile solid, which organoleptic characteristics are: slightly lighter green colour than avocado in its natural state, distinct smell and taste.

The protein, fat, carbohydrate and fibre content of dehydrated avocado in pieces is equal to the content in fresh avocados.

The Kjeldalh method was the technique used to determine proteins, the Bryan & Dye extraction was used to determine the amount of fat of the dehydrated avocado, the constant weight technique was used to determine humidity and the raw fibre technique was used to determine the amount of fibre.

Trials were made with different varieties of avocados, the best results being obtained with Hass avocado, a reason why the data hereinafter indicated refers only to this variety.

Dehydrated avocado in pieces is obtained through a process that consists of the following steps:

Selection of the avocado: The ripeness level must be higher than the climacteric maximum. The avocado must be free of diseases and/or plagues typical of the fruit and also must lack damages to its skin. The caliber of the avocado is not a relevant parameter.

Pre-cooling: The selected avocados are optionally chamber cooled to minimise the ripening progress and generate the best possible conditions for peeling the avocado as well as minimising the impact of the next process.

Scalding: During this step the entire avocado is submerged either manually or automatically in a hot water bath at boiling temperature for a recommended time of less than 1 minute. Spraying with cold water from the tap is recommended when the avocado is taken out from the bath in order to stop the heating process towards the inside of the fruit. This process loosens the skin off the fruit due to the expansion of the steam generated between the internal surface of the skin and the external surface of the pulp.

Cooling: The selected avocados are optionally cooled off in water to stop the temperature from increasing towards the inside of the fruit.

Cutting the tip: Afterwards, the avocado section immediately behind the petiole is cut, thus removing this section. This cut can be made either manually or automatically. To help in the next step of the process, the cut can also include vertical incisions of a depth of less than 1 mm on the exposed area of the avocado, so that slits are made in the skin that will make it easier to open and subsequently remove the same.

Removal of the skin: The time between scalding and this step must be as short as possible. This step can be done either manually or automatically forcing sliding of the skin with respect to the surface of the avocado pulp.

Antioxidant application: Immediately after the removal of the skin, the product can be optionally immersed in or sprayed with an antioxidant (for example, citric acid.)

Slicing of the avocado: Then, the avocado is sliced either manually or automatically. Please note that the avocado is sliced with the pit included, so the slices will have sections of the same. The recommended thickness of the cut is less than 10 mm.

Antioxidant application: Immediately after slicing, both sides of the slices are optionally bathed or sprayed with an antioxidant (for example, citric acid.)

Salting: With the purpose of stimulating the osmotic dehydration of the avocado and providing a salty flavour to the end product, common salt is optionally applied to both surfaces of the slices. The application of citric acid promotes the adherence of the salt to the avocado surface. This process can be made either manually or automatically.

Dehydration: The dehydration process of the avocado slices is done by means of vacuum and microwave dehydration. The application of microwave together with vacuum helps with the evaporation, by reducing the temperature and time of the process. The energy and time of application will depend directly on the thickness of the slices, as well as the desired final humidity level. The microwave energy applied must be between 0.1 watts per gram and 10 watts per gram, and with respect to vacuum the recommended pressure level is between 0 and 200 millimetres of mercury (mm Hg.)

Removal of the pit: During the dehydration process, the pit size decreases more than the rest of the product, so the pit can be easily removed. This removal can be made either manually or automatically through gravity and vibration.

Cooling: Previous to packing, the product is optionally cooled, allowing the remaining humidity to escape.

Packing: The dehydrated avocado pieces can be optionally packed under modified atmosphere (CO2 o N2) conditions to maximise its preservation. Optionally, the packaging can include an oxygen, water and light barrier. Nevertheless the aforementioned, the product has great stability under standard environmental conditions.

The end product obtained are slices of whole avocado without skin and pit, with a crispy and fragile consistency and the distinctive organoleptic properties of the avocado, very similar to the properties of the fresh product, and with natural additives that scarcely affect its original characteristics.

The chemical composition and the caloric value of the product obtained are detailed below in Table 1.

TABLE 1

CHEMICAL COMPOSITION OF DEHYDRATED AVOCADO PER 100 GRAMS OF END PRODUCT

| CALORIES | CARBOHYDRATES | PROTEINS | OIL | WATER | FIBRE |
|---|---|---|---|---|---|
| 616-708 | 17.6-30.4 g | 6.8-8.4 g | 61.2-69.2 g | 0.5-1.5 g | 5.6-8.4 g |

Once the above-described process has ended, an amount of dehydrated avocado in pieces is obtained having 25% in weight in relation to the amount of pure avocado pulp used. This percentage will depend on the variety of the avocado and the dehydration parameters used.

It is estimated that the shelf life of the packed product must be of almost 1 year. The dehydrated product allows to preserve the avocado as a raw material at a lower cost than traditional products.

Dehydrated avocado pieces with or without salt can be eaten directly as a salty or non-salty snack, used as an ingredient of other products or specific components of interest of a particular industries can be extracted, such as pigments, oil and active components.

On the other hand, the pieces can also be subjected to a conventional grinding process, thus obtaining any desired granulometry, even dehydrated avocado powder.

Finally, dehydrated avocado pieces can be rehydrated, recovering most of the properties of the fresh product and then use it in traditional ways.

EXAMPLE 1

100 grams of avocado slices of 1 mm thickness are dehydrated and put inside a basket exposing the whole of its surface, a vacuum of 50 mm of mercury is applied with an energy of 1 kW for 1 minute. The final product has less than 1% humidity in weight-to-weight proportion.

EXAMPLE 2

100 grams of avocado sliced to a thickness of 1.5 mm are dehydrated and put inside a basket, exposing the whole of their surface, 2 cycles of a vacuum of 60 mm of mercury is applied with an energy of 1 kW for 0.6 minutes each. The product obtained has less than 1% humidity in weight-to-weight proportion.

The invention claimed is:

1. A process for dehydrating an avocado comprising the steps of: selecting the avocado at a ripeness level higher than a climacteric maximum; pre-cooling the avocado; scalding the avocado; cutting a tip of the avocado, wherein the tip of the avocado is a section of the avocado immediately behind a petiole of the avocado; removing skin from the avocado; slicing the avocado with the pit included into annular shaped pieces; applying vacuum and microwave dehydration to the avocado slices with the pit included; and removing the pit sections from the slices.

2. The process of claim 1, further comprising applying antioxidant to the avocado immediately after removing skin from the avocado.

3. The process of claim 1, further comprising applying antioxidant to both sides of the slices after the step of slicing the avocado.

4. The process of claim 1, further comprising the step of cooling the avocado slices after the step of applying vacuum and microwave dehydration to the avocado slices.

5. The process of claim 1, further comprising the step of packing the avocado slices.

6. The process of claim 1, further comprising peeling the avocado by mechanically applying force to slide the skin off the pulp surface after scalding the avocado at 100° C. for 30 seconds after the step of cutting the tip of the avocado.

7. The process of claim 1, wherein the pit is removed through vibration and gravity.

8. The process of claim 1, wherein the avocado pieces are dehydrated at 0.5% to 1.5% humidity in weight-to-weight proportion, vacuum dehydration is applied at an absolute pressure in the range of 0 to 200 mm of Hg and microwave energy in the range of 0.5 watts per gram up to 10 watts per gram.

9. The process of claim 1, wherein the avocado is sliced into annular pieces of a thickness between 1 mm and 10 mm.

* * * * *